United States Patent
Salle et al.

(10) Patent No.: US 6,449,020 B1
(45) Date of Patent: Sep. 10, 2002

(54) CHROMINANCE SIGNAL AMPLITUDE REGULATION DEVICE

(75) Inventors: Didier Salle, Grenoble; Gérard Bret, Echirolles, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/268,971

(22) Filed: Mar. 16, 1999

(30) Foreign Application Priority Data

Apr. 23, 1998 (FR) .............................................. 98 05098

(51) Int. Cl.[7] .................................................. H04N 9/64
(52) U.S. Cl. ........................................ 348/645; 348/646
(58) Field of Search ................................ 348/645–649, 348/638, 639, 708, 679, 728

(56) References Cited

U.S. PATENT DOCUMENTS

| | | | |
|---|---|---|---|
| 3,943,560 A | | 3/1976 | Freestone |
| 4,466,015 A | * | 8/1984 | Wargo et al. ................ 348/646 |
| 4,523,223 A | * | 6/1985 | Lüder et al. ................. 348/646 |
| 4,635,102 A | | 1/1987 | Bolger |
| 4,673,970 A | * | 6/1987 | Matsumoto et al. ......... 348/646 |
| 5,359,368 A | * | 10/1994 | Srivastava ................... 348/641 |
| 5,432,564 A | * | 7/1995 | Tonami ....................... 348/646 |
| 5,627,599 A | * | 5/1997 | Hong ........................... 348/643 |

OTHER PUBLICATIONS

Patent Abstracts of Japan, vol. 95, No. 3, Apr. 28, 1995 and JP 06 335015A (Matsushita Electric).

* cited by examiner

Primary Examiner—Victor R. Kostak
(74) Attorney, Agent, or Firm—Lisa K. Jorgenson; Allen, Dyer, Doppelt, Milbrath & Gilchrist, P.A.

(57) ABSTRACT

A device for regulating the amplitude of a chrominance signal includes a variable gain amplifier having an input receiving a sub-carrier signal, and an output providing a regulated sub-carrier signal. The gain of the amplifier is controlled by two regulation loops. The first regulation loop operates during the duration of the reference burst. The second regulation loop operates during the visible line. Each of these loops include an up/down counter controlled by a clock. A digital-analog converter has an input receiving the output signals from the first and second up/down counters. An output signal from the digital-analog converter is connected to the gain control of the amplifier. The digital-analog amplifier is controlled by another clock.

21 Claims, 2 Drawing Sheets

CHROMINANCE SIGNAL AMPLITUDE REGULATION DEVICE

FIELD OF THE INVENTION

This invention relates to the field of video signal processing, and, more particularly, to chrominance signal processing devices and methods.

BACKGROUND OF THE INVENTION

The signal amplitude of a video signal has to be controlled before the chrominance sub-carrier can be demodulated. This function is done by amplifying the sub-carrier E using a variable gain amplifier 10, the gain of which is controlled by a loop, as shown in FIG. 1. This circuit is well known to experts in the field, and is described in an article titled "Fundamental Television Course; Emission-Reception-Television" by R. Besson, Editions Radio, fifth edition, Chapter XXIII, pages 400–415. This circuit includes a variable gain amplifier 10 having an output connected to a level measurement circuit 11 followed by a filter circuit 12. The output of the filter circuit 12 is connected to the gain control of the amplifier 10. The output of the variable gain amplifier 10 is the regulated sub-carrier output S.

Signals may be frequency, phase or amplitude modulated, depending on the transmission standard. To provide precise regulation, the gain is measured and adjusted during transmission of a reference burst 13 located at the beginning of each video scanning line, as shown in FIG. 2. Throughout the duration of the line, the amplifier gain is kept at the value obtained after the regulation phase at the beginning of the line. This type of regulation loop is often called AGC (Automatic Gain Control) or ACC (Automatic Color Control).

The line signal amplitude that corresponds to color saturation is variable depending on the content of the transmitted picture. Furthermore, since the duration of the reference burst is very short, e.g., 2 or 3 microseconds, it is subject to deterioration. Since the demodulator linearity range is limited, a device is needed to reduce the amplifier gain if the signal is too strong on the line signal. Normally, the line signal amplitude must not be more than 2.6 times the amplitude of the reference burst.

This device is designed to prevent overload of the demodulator, and is frequently called the ACC overload. This device must only be active above a threshold defined as a function of the video signal transmission standard. The most frequent embodiments of this type of device make use of analog regulation loops like those shown in FIG. 3.

In the circuit illustrated in FIG. 3, there is a first loop comprising a first variable gain amplifier 20 into which the sub-carrier E is applied as an input. The first variable gain amplifier 20 is followed by a second variable gain amplifier 21 in which the output is connected to a level measurement circuit 22. This output is the regulated sub-carrier output S. A first output of the level measurement circuit 22 is connected to a burst comparison circuit 23. The output of the burst comparison circuit 23 is connected to the gain control of the first amplifier 20, and to a first capacitor C1 which is connected to ground. A second loop including the second variable gain amplifier 21 is connected to the level measurement circuit 22. A second output of the level measurement circuit 22 is connected to a line comparison circuit 24. The output of the line comparison circuit 24 is connected to the gain control of the second variable gain amplifier 21, and to a second capacitor C2 which is connected to ground.

In the first loop, the signal amplitude is measured at the output from the second variable gain amplifier 21 and is then compared with a reference burst. The signal obtained is used to charge or discharge the first capacitor C1, depending on the sign of the comparison. The gain control of the first variable gain amplifier 20 is controlled by the voltage of the capacitor C1 that then filters the first loop. A capacitor C1 with a sufficiently high value, e.g., greater than one microfarad, has to be used to obtain a time constant on the order of 300 to 400 lines. The charge and discharge system must be made to obtain a longer time constant for an increasing gain than for a reducing gain.

In the second loop (ACC overload) there is a second filter capacitor C2, and the second variable gain amplifier 21. Time constants are also very different in this loop. The gain should be made to decrease more quickly when the modulation level during the line exceeds the maximum threshold. However, the return to normal gain takes place with a very long time constant on the order of 400 to 1000 lines.

This type of circuit has the disadvantage because it requires two external capacitors C1 and C2 during integration. Therefore, two outputs are required on the integrated circuit, and two variable gain amplifiers 20 and 21 are also required.

SUMMARY OF THE INVENTION

An object of the invention is to provide a device for regulation of the amplitude of a chrominance signal that no longer requires the above described two filter capacitors, and therefore, no longer requires the two outputs on the integrated circuit. Consequently, a single variable gain amplifier may be used instead of two variable gain amplifiers.

A device for regulation of the amplitude of the chrominance signal includes a variable gain amplifier into which the sub-carrier signal is input. The variable gain amplifier outputs a regulated sub-carrier signal, the gain of which is controlled by two regulation loops. The first regulation loop occurs during the reference burst, and the second regulation loop occurs during the visible line. Each of these loops includes an up/down counter controlled by a clock. The up/down counter includes a digital-analog converter controlled by another clock, into which the output signals from these first and second up/down counters are applied as inputs. The output signal of the digital-analog converter is connected to the amplifier gain control.

The digital-analog converter is advantageously non-linear. It satisfies the relation Gn=Kan, where n is the converter input code and K and a are constants. Advantageously, the device according to the invention includes means for multiplexing regulation magnitudes.

In one advantageous embodiment, the device according to the invention includes a peak-to-peak level measurement circuit connected to the first inputs of a first and a second comparator. The second inputs of these comparators are connected to the inputs of two switches, each switch is controlled by the reference burst signal. The two switches select first and second thresholds among two pairs of thresholds. The outputs of the comparators are connected to the corresponding inputs of two additional switches controlled by the reference burst signal. The first outputs from these two switches are connected to the corresponding two inputs of a first clock control device, and their second outputs are connected to the corresponding two inputs of a second clock control device.

The first clock control device receives the output from a first clock, and is followed by the first up/down counter. The second clock control device receives the output from a second clock and is followed by the second up/down counter. The output from the first up/down counter is connected directly to the first input of an adder. The output from the second up/down counter is connected to the second input of this adder through a switch controlled by the reference burst signal. The output from this adder is connected to the input of the digital-analog converter.

Advantageously, up/down counters and the digital-analog converter are seven bit devices. The chrominance signal amplitude regulation device according to the invention has the following advantages. There are no components external to the integrated circuit. Only one controlled gain amplifier is necessary, which improves the signal-to-noise ratio. The main time constants can be flexibly programmed. Digital information about the input signal level can be used externally. This invention also relates to an integrated circuit for processing of chrominance signals comprising the device described above.

DETAILED DESCRIPTION OF THE PREFERRED EMBODIMENTS

Figure 3:
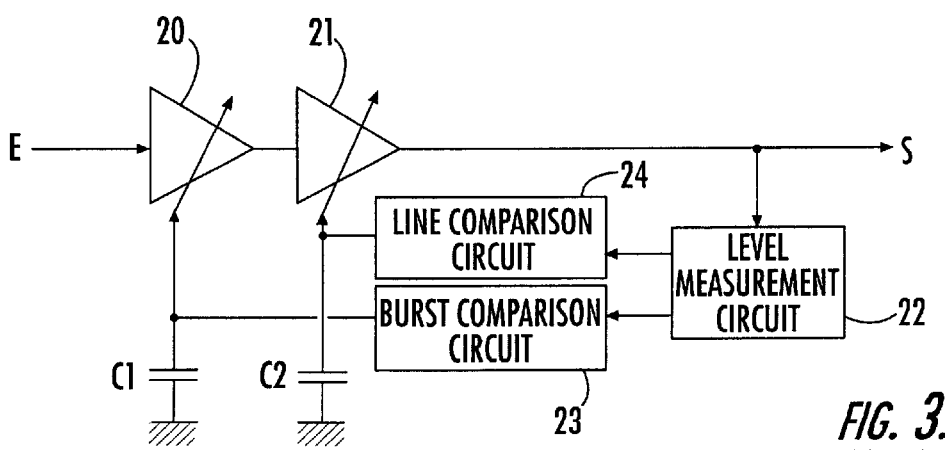
FIG. 3 illustrates a second chrominance signal regulation device according to prior art.
Figure 4:
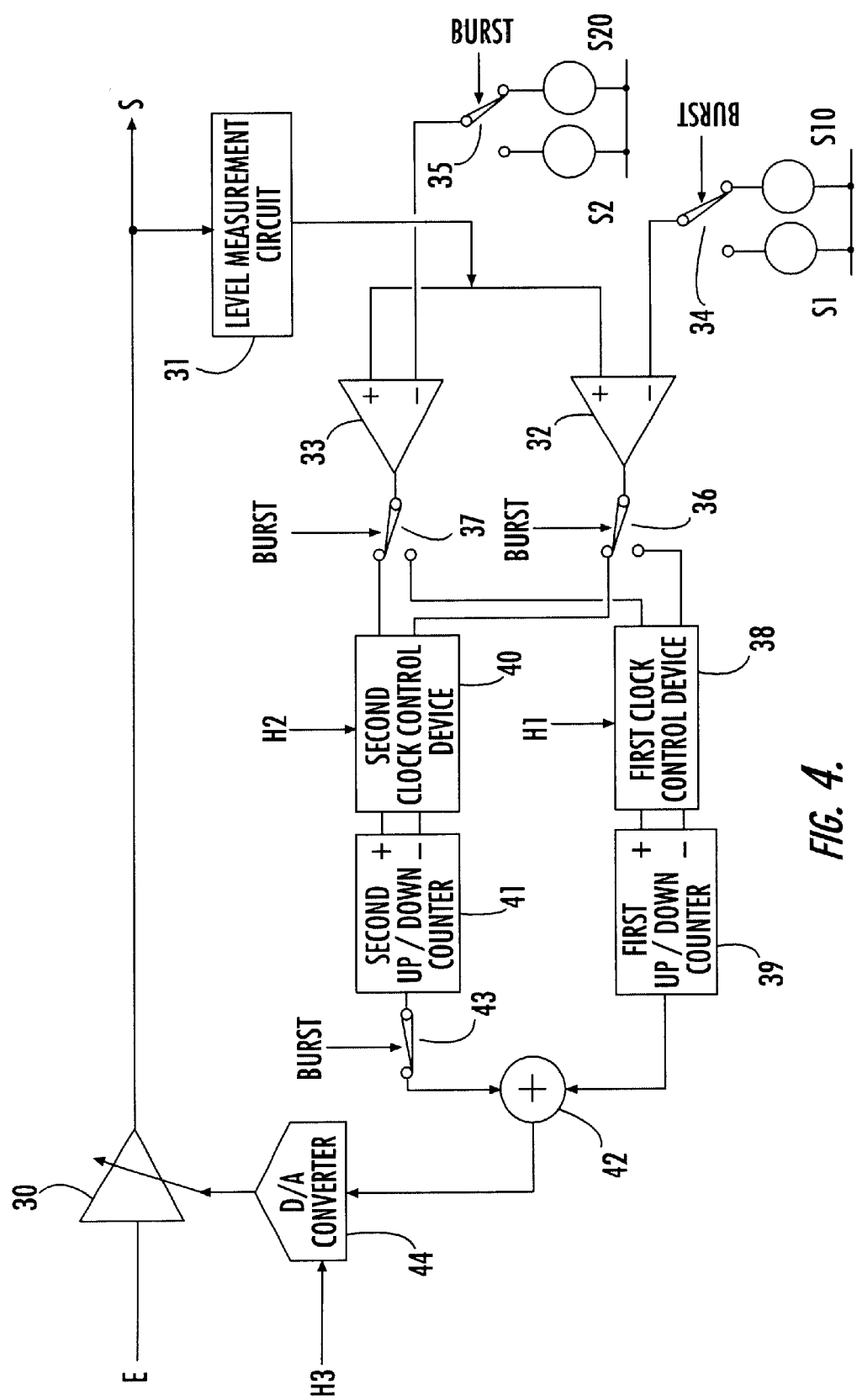
FIG. 4 illustrates the chrominance signal regulation device according to the present invention.

In the chrominance regulation device according to the present invention, the control part of the two adjustment loops shown in FIG. 3 is made using a digital system. This eliminates the two filter capacitors necessary in the prior art device, as shown in FIG. 3.

The device according to the invention comprises a variable gain amplifier 30, which receives a sub-carrier signal E as input and produces a regulated sub-carrier signal S as output. This output is connected to a peak-to-peak level measurement circuit 31, the output of which is connected to the first inputs "+" of a first and a second comparator 32 and 33.

The second inputs "−" to these two comparators 32 and 33 are connected to the corresponding inputs of two switches 34, 35 controlled by the reference burst signal to select a first threshold (S1 or S10) and a second threshold (S2 or S20) from the two pairs of thresholds S1, S10 and S2, S20. The output of these two comparators 32 and 33 are connected to the respective inputs of another two switches 36 and 37 controlled by the reference burst signal.

These two switches 36 and 37, which are synchronously controlled, have their first outputs connected to the corresponding two inputs of a first clock control device 38. A first clock H1 is applied as an input to the first clock control device 38. A first up/down counter 39 follows the first clock control device 38, and has, for example, 7 bits with its respective "+" or "up" count input and "−" or "down" count input. The corresponding second outputs of the two switches 36 and 37 are connected to the two inputs of a second clock control device 40. A second clock H2 is applied as an input to the second clock control device 40. A second up/down counter 41 having, for example, 7 bits, is connected to the output of the second clock control device 40.

The output from the first up/down counter 39 is connected directly to the first input of an adder 42. The output from the second up/down counter 41 is connected to the second input of the adder 42 through a switch 43 controlled by the reference burst signal. The output from the adder 42 is connected to a digital-analog converter 44, for example, a 7 bit converter, controlled by a third clock H3. The output of the digital-analog converter 44 is connected to the gain control of amplifier 30.

The first clock control device 38 and the first up/down counter 39 are used to form the first loop, or the ACC burst loop as defined with reference to FIG. 3. The second clock control device 40 and the second up/down counter 41 form the second loop, or the ACC overload loop. Therefore, by multiplexing the regulation magnitudes S1, S10 and S2, S20, it is possible to use only one variable gain amplifier 30.

Figure 1:
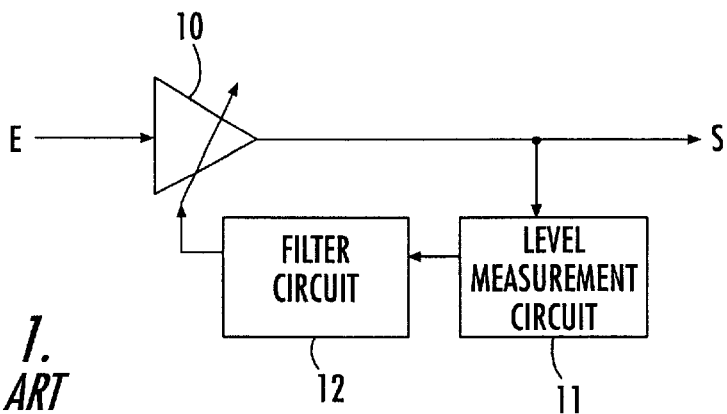
FIG. 1 illustrates a first chrominance signal regulation device according to prior art.
Figure 2:
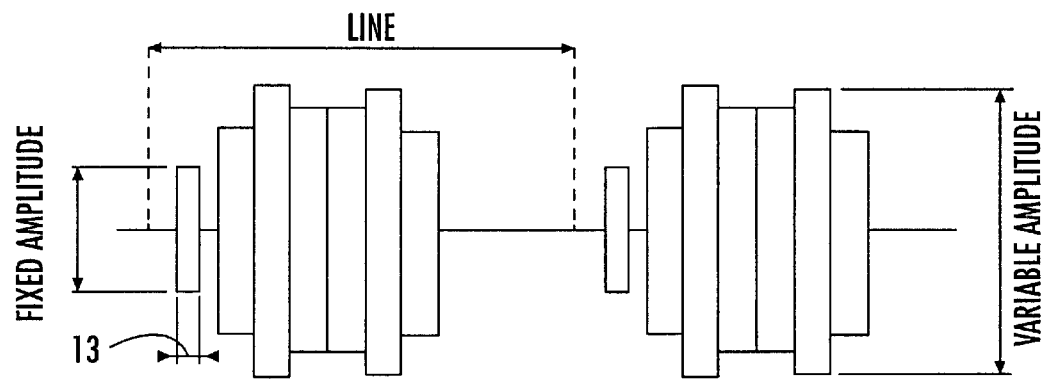
FIG. 2 illustrates operation of the device of FIG. 1.

In a conventional analog device, as shown in FIG. 1, the sub-carrier signal E to be regulated passes through the controlled gain amplifier 30. The level measurement circuit 31 measuring the peak-to-peak amplitude of the signal outputs the magnitude to be regulated to the two comparators 32 and 33. Measuring, for example, may consist of measuring the signal amplitude after rectification and filtering, as is well known to an expert in the field. The threshold S1 (or S10) and S2 (or S20) references define the set value for this servocontrol. The maximum gain is obtained for code 0 of the digital-analog converter 44.

Two regulation loops are now considered. The first burst amplitude regulation loop is pulse calibrated for 2 or 3 $\mu$s. The sequence takes place as follows. The burst amplitude is measured and the value is stored. The first up/down counter 39 at the end of the line operates just before the next burst for every line when counting and every n1 lines when decrementing the count.

The following three cases may arise:

Burst amplitude<S1→Up/down counter 39 is decremented every n1 lines; that is, a pulse from clock H1 is applied to the decrement input of the up/down counter 39.

S1<burst amp.<S2→The up/down counter 39 does not function.

Burst amplitude>S2→Up/down counter 39 is incremented for every line with clock H1; that is, a pulse from the clock H1 is applied as an input to the count input.

The state of the first up/down counter 39 is sent to the gain control of the amplifier 30 through the digital-analog converter 44. Under steady state conditions, the loop regulates the reference burst such that its amplitude is between S1 and S2. The clock H3 validates the information at the input of digital-analog converter 44, thus remaining compatible with the operation of the first up/down counter 39.

The second line amplitude regulation loop (ACC overload) will now be discussed. References S1 and S2, which become S10 and S20, define the new set values for the servocontrol.

The following three cases may arise:

Line signal amplitude<S10→Up/down counter 41 is decremented every n2 frames.

S10 <line signal amp.<S2→The up/down counter 41 does not function.

Line amplitude signal>S20→Counting takes place on up/down counter 41 with a fast clock H2 until threshold S20 is exceeded.

The contents of the second up/down counter 41 are added to the contents of the first burst regulation up/down counter 39. Therefore, this line regulation corrects, i.e., reduces the gain obtained with the burst regulation. If the sub-carrier during the line does not exceed threshold S10, the line regulation loop remains at the stop (code 0), and the value of the gain of the amplifier 30 remains the same during the line and the burst.

The output signals from the first and second counters 39, 41 are only summed during the line. The output signal from the second up/down counter 41 is not present at the input of adder 42 during the reference burst because the switch 43 is controlled by this burst. Therefore, the value at the output signal of this adder 42 is equal to the output signal from the first up/down counter 39.

The first loop, which is the main loop, is used to obtain an equilibrium value of the amplitude of the reference burst between S1 and S2. The second loop only reduces the gain of the first loop, if necessary, by obtaining an equilibrium value of the amplitude of the line signal between S10 and S20. The gain of the first loop only changes during non-visible parts of the video signal, whereas the second loop ("AGC overload") may affect the decrease in the gain during the line (fast action).

Therefore, the device according to the invention servo-controls the output level between thresholds S1 (or S10) and S2 (or S20). To insure loop stability, the change in the level of the output from the digital-analog converter 44 produced by a change in the state of the lowest order bit at the input must always be less than the difference between S1 (S10) and S2 (S20), regardless of the level of the input signal.

If Gn is the gain of amplifier 30 for input code n of digital-analog converter 44, then it is necessary that:

$$\frac{G_n}{G_{n+1}} = constant$$

This is obtained if Gn=K×A$^n$, where A and K are constants. This variation may be achieved using a non-linear digital-analog converter 44 based on a potentiometer type architecture. The following values are used in one example embodiment of the device according to the invention:
1) Examples of comparison thresholds
   First loop: S1=148 mV S2=152 mV
   Second loop: S10=450 mV S20=S10+3 dB=630 mV
2) Choice of clock frequencies
   H1: 15.625 kHz for incrementing (line frequency) 488 Hz for decrementing (line frequency divided by 32)
   H2: 750 kHz during the visible line for incrementing 25 Hz for decrementing
   H3: 750 kHz The choice on the bit size of the converter and up/down counters is best determined by the compromise to be made between regulation precision and manufacturing cost.

That which is claimed is:

1. A device for regulating amplitude of a chrominance signal, the device comprising:
   a variable gain amplifier having an input receiving a sub-carrier signal, and an output providing a regulated sub-carrier signal;
   a first regulation loop operating during a reference burst signal, said first regulation loop comprising a first up/down counter controlled by a first clock signal;
   a second regulation loop operating during a visible line signal, said second regulation loop comprising a second up/down counter controlled by a second clock signal; and
   a digital-analog converter controlled by a third clock signal, and having an input receiving output signals from said first and second up/down counters, and having an output connected to a gain control input of said variable gain amplifier so that the gain is controlled by said first and second regulation layers.

2. A device according to claims 1, wherein said digital-analog converter is non-linear.

3. A device according to claim 2, wherein said digital-analog converter operates according to a relation Gn=KA$^n$, where Gn is the gain of the amplifier, n is an input code to said analog-digital converter, and A and K are constants.

4. A device according to claim 1, further comprising means for multiplexing regulation magnitudes provided by said first and second regulation loops.

5. A device according to claim 1, further comprising:
   a level measuring circuit having an input receiving the regulated sub-carrier signal, and measuring peak-to-peak signal levels;
   a first switch controlled by the reference burst signal to select one of a first and second threshold from a first pair of thresholds;
   a second switch controlled by the reference burst signal to select one of a first and second threshold from a second pair of thresholds;
   a first comparator having a first input receiving an output signal from said level measuring circuit, and a second input connected to said first switch;
   a second comparator having a first input receiving the output signal from said level measuring circuit, and a second input connected to said second switch;
   a third switch connected to an output of said first comparator, said third switch being controlled by the reference burst signal; and
   a fourth switch connected to an output of said second comparator, said fourth switch being controlled by the reference burst signal.

6. A device according to claim 5, wherein said first regulation loop comprises a first clock control device having first and second inputs connected to respective first outputs of said third and fourth switches, and having a third input receiving a first clock signal; and wherein said second regulation loop comprises a second clock control device having first and second inputs connected to respective second outputs of said third and fourth switches, and having a third input receiving a second clock signal.

7. A device according to claim 6, further comprising:
   a fifth switch connected to said second up/down counter, said fifth switch being controlled by the reference burst signal; and
   an adder having a first input connected to said first up/down counter, and a second input connected to said fifth switch, and an output connected to an input of said digital-analog converter.

8. A device according to claim 1, wherein said first and second up/down counters and said digital-analog converter are 7-bit devices.

9. A video signal processing circuit comprising:
   a circuit for generating a chrominance signal from a video input signal;
   a device for regulating amplitude of the chrominance signal, said device comprising
      a variable gain amplifier having an input receiving a sub-carrier signal, and an output providing a regulated sub-carrier signal,
      a first regulation loop operating during a reference burst signal, said first regulation loop comprising a first up/down counter controlled by a first clock signal, a second regulation loop operating during a visible line signal, said second regulation loop comprising a second up/down counter controlled by a second clock signal, and a digital-analog converter controlled by a third clock signal, and having an input receiving output signals from said first and second up/down counters, and having an output connected to a gain control input of said variable gain amplifier so that the gain is controlled by said first and second regulation layers.

10. A video signal processing circuit according to claim 9, wherein said digital-analog converter is non-linear.

11. A video signal processing circuit according to claim 10, wherein said digital-analog converter operates according to a relation $Gn=KA^n$, where Gn is the gain of the amplifier, n is an input code to said analog-digital converter, and A and K are constants.

12. A video signal processing circuit according to claim 9, further comprising means for multiplexing regulation magnitudes provided by said first and second regulation loops.

13. A video signal processing circuit according to claim 9, further comprising:

a level measuring circuit having an input receiving the regulated sub-carrier signal, and measuring peak-to-peak signal levels;

a first switch controlled by the reference burst signal to select one of a first and second threshold from a first pair of thresholds;

a second switch controlled by the reference burst signal to select one of a first and second threshold from a second pair of thresholds;

a first comparator having a first input receiving an output signal from said level measuring circuit, and a second input connected to said first switch;

a second comparator having a first input receiving the output signal from said level measuring circuit, and a second input connected to said second switch;

a third switch connected to an output of said first comparator, said third switch being controlled by the reference burst signal; and a fourth switch connected to an output of said second comparator, said fourth switch being controlled by the reference burst signal.

14. A video signal processing circuit according to claim 13, wherein said first regulation loop comprises a first clock control device having first and second inputs connected to respective first outputs of said third and fourth switches, and having a third input receiving a first clock signal; and wherein said second regulation loop comprises a second clock control device having first and second inputs connected to respective second outputs of said third and fourth switches, and having a third input receiving a second clock signal.

15. A video signal processing circuit according to claims 14, further comprising:

a fifth switch connected to said second up/down counter, said fifth switch being controlled by the reference burst signal; and an adder having a first input connected to said first up/down counter, and a second input connected to said fifth switch, and an output connected to an input of said digital-analog converter.

16. A device according to claim 9, wherein said first and second up/down counters and said digital-analog converter are 7-bit devices.

17. A method for regulating amplitude of a chrominance signal, the method comprising the steps of:

passing a sub-carrier signal through a variable gain amplifier;

operating a first regulation loop cooperating with the variable gain amplifier and controlling the gain thereof during a reference burst signal, the first regulation loop comprising a first up/down counter controlled by a first clock signal;

operating a second regulation loop cooperating with the variable gain amplifier and controlling the gain thereof during a visible line signal, the second regulation loop comprising a second up/down counter controlled by a second clock signal; and performing a digital-analog conversion based upon a third clock signal and on output signals from the first and second up/down counters; and controlling a gain of the variable gain amplifier based upon an output of the digital-analog converter using the first and second regulation loops.

18. A method according to claim 17, wherein the digital-analog converter is non-linear.

19. A method according to claim 18, further comprising operating the digital-analog converter according to a relation $Gn=KA^n$, where Gn is a gain of the amplifier, n is an input code to the analog-digital converter, and A and K are constants.

20. A method according to claim 17, further comprising multiplexing regulation magnitudes provided by the first and second regulation loops.

21. A method according to claim 17, further comprising:

measuring peak-to-peak signal levels of the regulated sub-carrier signal;

controlling a first switch by the reference burst signal to select first or second thresholds from a first pair of thresholds;

controlling a second switch by the reference burst signal to select first and second thresholds from a second pair of thresholds.

* * * * *